United States Patent Office 2,699,451
Patented Jan. 11, 1955

2,699,451

PROCESS FOR THE PRODUCTION OF ORGANIC AMINO DIOL DERIVATIVES

George W. Moersch, Detroit, Mich., assignor to Parke, Davis & Company, Detroit, Mich., a corporation of Michigan No Drawing. Application November 8, 1950, Serial No. 194,730

7 Claims. (Cl. 260—562)

This invention relates to a process for the production of organic amino diol derivatives. More particularly, the invention relates to a process for producing a 1-nitrophenyl-2-aminopropane-1,3-diol derivative having the formula,

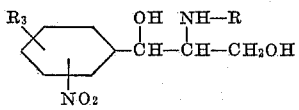

by the selective reduction of the ester and/or carboxyl groups present in a nitrophenyl serine derivative of formula,

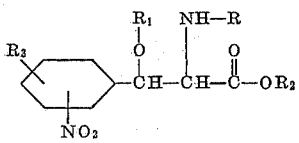

where R and $R_1$ are the same or different and represent hydrogen or acyl radicals, $R_2$ is hydrogen, a lower alkyl, a phenyl or a phenalkyl radical and $R_3$ is hydrogen, halogen, a lower alkyl or a lower alkoxy radical. The term "acyl" as used herein refers to carboxylic acid acyl radicals such as lower aliphatic acyl, halogenated lower aliphatic acyl, unsaturated lower aliphatic acyl, ether substituted lower aliphatic acyl, hydroxy substituted lower aliphatic acyl, benzoyl, halogen, nitro, alkyl and alkoxy substituted benzoyl, aralphatic acyl and the like radicals.

It will be appreciated by those skilled in the art that both the starting materials and the products of the process exist in structural or diastereo-isomeric as well as optical isomeric form. The term "structural" or diastereo-isomer as used herein refers to the relative spacial configuration of the groups on the two asymmetric carbon atoms. The compounds having the same spacial arrangement or configuration as threose and pseudo ephedrine will hereinafter be referred to as the "pseudo" ($\psi$) form, while those having the same spacial configuration as erythrose and ephedrine will be referred to as the "regular" (reg.) form.

Both the regular and pseudo forms exist as racemates of the optically active dextro ($d$) and levo ($l$) rotatory isomers as well as in the form of the individual or separated dextro and levo optical isomers.

Because of the difficulty of representing these structural differences in graphic formulae, the customary structural formulae will be used in both the specification and claims and a notation placed below or to the side of the formula to designate the particular structural and optical configuration of the compound. Where the formula represents the unresolved mixture of the structural and optical isomers, the notation "unresolved" will be used. However, it should be expressly understood that where no notation appears with a structural formula the formula is to be interpreted in its generic sense, that is, as representing the ($l$)-$\psi$, ($d$)-$\psi$, ($l$)-reg. or ($d$)-reg. isomers in separated form as well as the ($dl$)-$\psi$ or the ($dl$)-reg. optical racemates or the total unresolved mixture of structural and optical isomers. Such a formula does not merely represent the unresolved mixture of isomers.

In accordance with the invention the selective reduction of the nitrophenyl serine derivatives to the corresponding 1-nitrophenyl-2-aminopropane-1,3-diol derivative is carried out in an anhydrous non-hydroxylic organic solvent using lithium aluminum hydride as the reductant. The nitrophenyl serine starting materials for this invention may be prepared by methods described by G. Carrara et al., Gazz. Chim. Ital. 80, 709 (1950). Some of the solvents which have been found to be suitable are diethyl ether, dibutyl ether, dioxane, tetrahydrofurane, ethylene glycol dimethyl ether, ethylene glycol diethyl ether and the like.

The amount of lithium aluminum hydride used to bring about the selective reduction of the ester and/or carboxyl groups present in the nitrophenyl serine derivative is dependent upon the nature of the groups present in the starting material. In the instances where the nitrophenyl serine derivative contains hydroxyl and/or amino groups sufficient lithium aluminum hydride is used to react with these groups as well as with the ester and/or carboxyl groups. In general, best results are obtained when using from 10% more to 10% less than the theoretical quantity of lithium aluminum hydride necessary to react with the ester, carboxyl, amino and/or hydroxyl groups present in the nitrophenyl serine derivative. If desired, an excess up to about 35% can be used but, as stated before, best results are obtained with less than this amount. The theoretical amount of lithium aluminum hydride to be used with one mole of any given nitrophenyl serine derivative can be calculated very readily by reference to the following table.

TABLE

| X group present in the nitrophenyl serine derivative | Moles of $LiAlH_4$ to be used per X group present in the nitrophenyl serine derivative |
| --- | --- |
| carboxyl | 0.75 |
| ester | 0.5 |
| hydroxyl | 0.25 |
| amino | 0.5 |

For example, the theoretical quantity of lithium aluminum hydride to use with one mole of ethyl ($dl$)-$\psi$-N-dichloroacetyl p-nitrophenyl serinate is 0.25 plus 0.5 mole or a total of 0.75 mole, while the theoretical quantity to use with one mole of ($dl$)-$\psi$-p-nitrophenyl serine is 0.25 plus 0.5 plus 0.75 moles, or a total of 1.5 moles.

In carrying out the reduction the lithium aluminum hydride should be added to the nitrophenyl serine derivative to avoid the presence of any excess reductant in the reaction mixture. Best results are obtained by carrying out the addition slowly and in such a manner that it does not exceed the rate of reaction. The temperature during the reduction is not particularly critical. For example, temperatures as high as 50° C. and as low as 0° C. can be used. The optimal temperature is in the range of about 15 to 35° C.

After the reduction phase of the process has been completed, the metal complex is decomposed with water. The amount of water used for this purpose should be at least four moles for each mole of lithium aluminum hydride used in the reduction. In practical operation several times the minimal quantity of water is usually used, the only upper limit on the quantity being one of practicality. In some instances, notably where R in the nitrophenyl serine derivative is an acyl radical, the isolation of the product can be facilitated by adding a mineral acid to the water in order to dissolve the hydroxides of lithium and aluminum formed by the decomposition of the metal complex.

The products obtained by the process of the present invention are antibiotics per se or are useful intermediates for the preparation of other organic compounds possessing antibiotic activity.

The invention is illustrated by the following examples.

*Example 1*

(a) 3.23 g. of lithium aluminum hydride dissolved in 100 cc. of anhydrous ether is added dropwise with stirring to 36.5 g. of ethyl ($l$)-$\psi$-N-dichloroacetyl-p-nitrophenyl serinate in 5.5 liters of anhydrous ether over a period of six hours at room temperature. After the addition has been completed the reaction mixture is stirred for an additional four hours. 350 cc. of 2 N hydrochloric acid is added slowly to the reaction mixture to decompose the insoluble metal complex and the ether phase separated. The aqueous phase is extracted with several portions of ethyl acetate, the extracts combined, dried and evaporated to dryness in vacuo. The ether phase is washed with water, dried and evaporated to dryness in vacuo. The residues from the ether phase and ethyl acetate extracts are combined and dissolved in 500 cc. of acetone. 500 cc. of 0.1 N aqueous sodium hydroxide solution is added and the mixture allowed to stand at 20° C. for one hour. The solution is neutralized in the cold with dilute hydrochloric acid and the acetone evaporated in vacuo. The aqueous residue is made alkaline with dilute sodium hydroxide solution and extracted with several portions of ethyl acetate. The combined extracts are washed, dried and the ethyl acetate distilled to obtain the desired (l) - ψ - 1 - p - nitrophenyl - 2 - dichloroacetamidopropane-1,3-diol of formula,

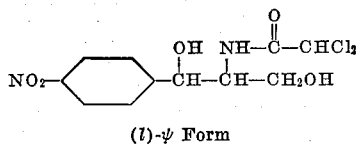

(l)-ψ Form

The product is purified by recrystallization from ethylene dichloride; M. P. 150–1° C.; $(\alpha)_D^{25} = -25.5°$ in ethyl acetate and $+18.4°$ in alcohol.

By substituting an equivalent amount of ethyl (l)-ψ-N-dibromoacetyl p-nitrophenyl serinate for the ethyl (l)-ψ-N-dichloroacetyl p-nitrophenyl serinate used in the above procedure one obtains (l)-ψ-1-p-nitrophenyl-2-dibromoacetamidopropane-1,3-diol; M. P. 152–3° C.;

$$(\alpha)_D^{25} = +19.6°$$

in alcohol.

(b) 2.08 g. of lithium aluminum hydride dissolved in 100 cc. of anhydrous ether is added dropwise with stirring to 19.7 g. of methyl (l)-ψ-N-dichloroacetyl-O-acetyl-p-nitrophenyl serinate in 2 liters of anhydrous ether over a period of six hours at 20° C. After the addition has been completed, the reaction mixture is stirred for six hours and then treated with 200 cc. of 2 N hydrochloric acid to decompose the insoluble metal complex. The ether phase is separated, washed with water and the ether evaporated. The aqueous phase is extracted with ethyl acetate, the extracts combined, washed with water and the ethyl acetate distilled in vacuo. The residues from the ether phase and ethyl acetate extracts are combined and dissolved in 500 cc. of acetone. 500 cc. of 0.1 N aqueous sodium hydroxide solution is added and the mixture allowed to stand at room temperature for one hour. The solution is neutralized with dilute hydrochloric acid and the acetone distilled in vacuo. The aqueous residue is made alkaline with sodium hydroxide solution and extracted with several portions of ethyl acetate. The ethyl acetate extracts are combined, washed with water and dried. Distillation of the ethyl acetate in vacuo yields the desired (l) - ψ - 1 - p - nitrophenyl - 2 - dichloroacetamidopropane-1,3-diol which can be purified by recrystallization from ethylene dichloride; M. P. 150–1° C.;

$$(\alpha)_D^{25} = -25.5°$$

in ethyl acetate.

If desired, 18.9 g. of (l)-ψ-N-dichloroacetyl-O-acetyl-p-nitrophenyl serine can be substituted for the methyl (l) - ψ - N - dichloroacetyl - O - acetyl - p - nitrophenyl serinate used in the above procedure.

(c) 4.07 g. of lithium aluminum hydride dissolved in 150 cc. of anhydrous tetrahydrofurane is added dropwise with stirring to 33.7 g. of (l)-ψ-N-dichloroacetyl p-nitrophenyl serine in 4 liters of anhydrous tetrahydrofurane over a period of seven hours at room temperature. After the addition has been completed, the reaction mixture is stirred for five hours and then treated with 350 cc. of 2 N hydrochloric acid to decompose the insoluble metal complex. The organic phase is separated and the aqueous phase extracted with ethyl acetate. The ethyl acetate extracts are added to the organic phase, the mixture washed with water, then with dilute sodium hydroxide solution and finally with water again. The organic phase is dried and the solvents distilled. The residue which consists of crude (l)-ψ-1-p-nitrophenyl-2-dichloroacetamidopropane-1,3-diol is taken up in and recrystallized from ethyl acetate; M. P. 150–1° C.; $(\alpha)_D^{25} = -25.5°$ in ethyl acetate.

*Example 2*

(a) A solution of 1.61 g. of lithium aluminum hydride in 75 cc. of anhydrous ether is added dropwise with stirring to 18.3 g. of ethyl (l)-ψ-N-dichloroacetyl-p-nitrophenyl serinate in 3 liters of anhydrous ether over a period of six hours at room temperature. After the addition has been completed, the reaction mixture is stirred for five hours. 350° cc. of 1 N hydrochloric acid is added slowly to the reaction mixture to decompose the insoluble metal complex. The ether phase is separated, washed with water, dried and evaporated to dryness in vacuo. The aqueous phase is extracted with several portions of ethyl acetate, the extracts combined, dried and evaporated to dryness in vacuo. The residues from the ether phase and ethyl acetate extracts are combined and dissolved in 250° cc. of acetone. 250 cc. of 0.1 N aqueous sodium hydroxide solution is added and the mixture allowed to stand at room temperature for one hour. The solution is neutralized in the cold with dilute hydrochloric acid and the acetone evaporated in vacuo. The aqueous residue is made alkaline with dilute sodium hydroxide solution and extracted with several portions of ethyl acetate. The combined extracts are washed, dried and the ethyl acetate distilled to obtain the desired (dl)-ψ-1-p-nitrophenyl-2-dichloroacetamidopropane-1,3-diol. This compound which has the formula,

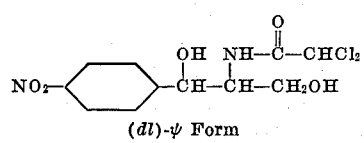

(dl)-ψ Form can be purified, if desired, by recrystallization from ethylene dichloride; M. P. 150–1° C.

(b) 2.08 g. of lithium aluminum hydride dissolved in 100 cc. of anhydrous ether is added dropwise with stirring to 22.5 g. of methyl (dl)-ψ-N-dichloroacetyl-O-benzoyl-p-nitrophenyl serinate in 5.0 liters of anhydrous ether over a period of six hours at 20° C. After the addition has been completed, the reaction mixture is stirred for six hours and then 200 cc. of 2 N hydrochloric acid added slowly to decompose the insoluble metal complex. The ether phase is separated, washed with water and the ether evaporated. The aqueous phase is extracted with ethyl acetate, the extracts, washed with water and the ethyl acetate distilled in vacuo. The residues from the ether phase and ethyl acetate extracts are combined and dissolved in 500 cc. of acetone. 500 cc. of 0.1 N aqueous sodium hydroxide solution is added and the mixture allowed to stand at room temperature for one hour. The solution is neutralized with dilute hydrochloric acid and the acetone distilled in vacuo. The aqueous residue is made alkaline with sodium hydroxide solution and extracted with several portions of ethyl acetate. The ethyl acetate extracts are combined, washed with water and dried. Distillation of the ethyl acetate in vacuo yields the desired (dl)-ψ-1-p-nitrophenyl-2 - dichloroacetamidopropane - 1,3 - diol in crude form. This product can be purified by recrystallization from ethylene dichloride; M. P. 150–1° C.

*Example 3*

5.13 g. of lithium aluminum hydride dissolved in 200 cc. of anhydrous ether is added dropwise with stirring to 25.4 g. of ethyl (l)-ψ-p-nitrophenyl serinate in 3 liters of anhydrous ether over a period of six hours at room temperature. After the addition has been completed the reaction mixture is stirred for six hours and then treated with 250 cc. of cold water to decompose the insoluble metal complex. The reaction mixture is evaporated to dryness in vacuo and the residue extracted exhaustively with cold absolute alcohol. The combined extracts are evaporated and the residue dissolved in 300 cc. of acetone. 300 cc. of 0.1 N aqueous sodium hydroxide solution is added and the mixture allowed to stand at room temperature for several hours. The solution is evaporated in vacuo to remove the acetone and the aqueous residue extracted with ethyl acetate. The combined extracts are dried and the ethyl acetate distilled to obtain the desired (l)-ψ-1-p-nitrophenyl-2-aminopropane-1,3-diol. This compound which has the formula,

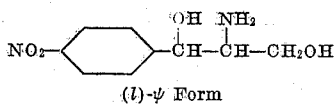

(l)-ψ Form can be purified, if desired, by recrystallization from water; M. P. 162–3° C.; $(\alpha)_D^{25} = -23°$ in methanol.

Example 4

A solution of 2.57 g. of lithium aluminum hydride dissolved in 100 cc. of anhydrous ether is added dropwise with stirring to 12 g. of methyl (dl)-ψ-p-nitrophenyl serinate in 2 liters of anhydrous ether over a period of about six hours at room temperature. After the addition has been completed, the reaction mixture is stirred for an additional six hours and then treated with 200 cc. of water to decompose the insoluble metal complex. The reaction mixture is evaporated to dryness in vacuo and the residue exhaustively extracted with cold absolute alcohol. The combined extracts are evaporated to dryness and the residue dissolved in 200 cc. of ethanol. 150 cc. of 2 N sodium hydroxide solution is added and the mixture allowed to stand for two hours. The ethanol is removed by distillation in vacuo and the aqueous residue extracted with ethyl acetate. The ethyl acetate extracts are dried and the ethyl acetate distilled to obtain the desired (dl)-ψ-1-p-nitrophenyl-2-aminopropane-1,3-diol. This compound which has the formula,

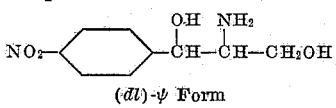

(dl)-ψ Form can be purified by recrystallization from ethylene dichloride; M. P. 140.5° C.

If desired, an equivalent amount of the phenyl ester of (dl)-ψ-p-nitrophenyl serine can be substituted for the methyl ester used in the above procedure.

Example 5

4.1 g. of lithium aluminum hydride dissolved in 150 cc. of anhydrous ether is added dropwise with stirring to 33.8 g. of ethyl (dl)-ψ-O,N-diacetyl-p-nitrophenyl serinate in 3.5 liters of anhydrous ether over a period of eight hours at room temperature. After the addition has been completed, the reaction mixture is stirred for an additional three hours and then treated with 350 cc. of 2 N sulfuric acid to decompose the insoluble metal complex. The ether phase is separated, washed with water and the ether evaporated. The aqueous phase is extracted with ethyl acetate, the extracts combined, washed with water and the ethyl acetate distilled in vacuo. The residues from the ether phase and ethyl acetate extracts are combined and dissolved in 1 liter of acetone. 1 liter of 0.1 N aqueous sodium hydroxide solution is added and the mixture allowed to stand at room temperature for one hour. The solution is neutralized with dilute hydrochloric acid and the acetone distilled in vacuo. The aqueous residue is made alkaline with sodium hydroxide solution and extracted with several portions of ethyl acetate. The ethyl acetate extracts are combined, dried and the ethyl acetate distilled in vacuo to obtain the desired (dl)-ψ-1-p-nitrophenyl - 2 - acetamidopropane - 1,3 - diol. This compound which has the formula,

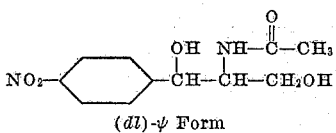

(dl)-ψ Form can be purified, if desired, by recrystallization from ethyl acetate-petroleum ether mixtures; M. P. 166–7° C.

If desired, 33.8 g. of ethyl (l)-ψ-O,N-diacetyl-p-nitrophenyl serinate can be substituted for the (dl)-ψ derivative used as a starting material in the above procedure. The product thus obtained is (l)-ψ-1-p-nitrophenyl-2-acetamidopropane-1,3-diol; M. P. 125–6° C.; $(\alpha)_D^{25} = +8.4°$ in alcohol.

Example 6

A solution of 1.61 g. of lithium aluminum hydride dissolved in 100 cc. of anhydrous ether is added dropwise with stirring to 17.9 g. of ethyl (dl)-ψ-N-benzoyl-p-nitrophenyl serinate in 5 liters of anhydrous ether over a period of six hours at room temperature. After the addition has been completed, the reaction mixture is stirred for an additional two hours and then treated with 300 cc. of 1 N hydrochloric acid to decompose the insoluble metal complex. The ether phase is separated, washed with water, dried and evaporated to dryness in vacuo. The aqueous phase is extracted with several portions of ethyl acetate, the extracts combined, dried and evaporated to dryness in vacuo. The residues from the ether phase and ethyl acetate extracts are combined and dissolved in 300 cc. of ethanol. 300 cc. of 0.1 N aqueous sodium hydroxide solution is added and the mixture allowed to stand at 20° C. for one hour. The solution is neutralized with dilute hydrochloric acid and the ethanol evaporated in vacuo. The aqueous residue is made alkaline with dilute sodium hydroxide solution and extracted with several portions of ethyl acetate. The combined extracts are washed with water, dried and the ethyl acetate distilled to obtain the desired (dl)-ψ-1-p-nitrophenyl-2-benzamidopropane-1,3-diol of formula,

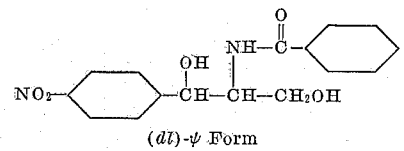

(dl)-ψ Form

This product can be purified by recrystallization from alcohol or from ethyl acetate; M. P. 162–3° C.

Example 7

2,08 g. of lithium aluminum hydride dissolved in 100 cc. of purified anhydrous tetrahydrofurane is added dropwise with stirring to 23.4 g. of methyl (dl)-reg.-N-methoxyacetyl - O - dichloroacetyl - 2 - ethoxy - 5 - nitrophenyl serinate in 3 liters of anhydrous ether over a period of six hours at room temperature. After the addition has been completed, the reaction mixture is stirred for an additional three hours and then 350 cc. of 1 N hydrochloric acid added slowly. The organic phase is separated, washed with water and evaporated to dryness in vacuo. The aqueous phase is extracted with several portions of ethyl acetate, the ethyl acetate extracts combined, dried and evaporated to dryness in vacuo. The residues from the ethyl acetate extracts and the organic phase are combined and dissolved in 500 cc. of acetone. 500 cc. of 0.1 N aqueous sodium hydroxide solution is added and the mixture allowed to stand at room temperature for one hour. The solution is neutralized with dilute hydrochloric acid and the acetone distilled in vacuo. The aqueous residue is made alkaline with sodium hydroxide solution and extracted with several portions of ethyl acetate. The ethyl acetate extracts are combined, washed with water and dried. Distillation of the ethyl acetate in vacuo yields the desired (dl)-reg.-1-(2'-ethoxy - 5' - nitrophenyl) - 2 - methoxyacetamidopropane-1,3-diol of formula,

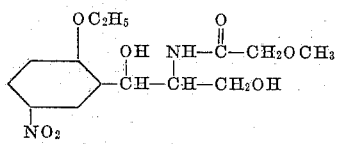

(dl)-Reg. form

This product can be purified by recrystallization from ethyl acetate-petroleum ether mixture.

Example 8

1.61 g. of lithium aluminum hydride dissolved in 100 cc. of anhydrous ether is added dropwise with stirring to 22.4 g. of benzyl (dl)-reg.-N-p-methylbenzoyl-3-methyl-4-nitrophenyl serinate in 5 liters of anhydrous ether over a period of six hours at room temperature. After the addition has been completed the reaction mixture is stirred for an additional two hours. 200 cc. of 2 N hydrochloric acid is added slowly to the reaction mixture to decompose the insoluble metal complex. The ether phase is separated, washed with water and evaporated to dryness in vacuo. The aqueous phase is extracted with several portions of ethyl acetate, the extracts combined and evaporated to dryness in vacuo. The residues from the ether phase and the ethyl acetate extracts are combined and dissolved in 300 cc. of acetone. 300 cc. of 0.1 N aqueous sodium hydroxide solution is added and the mixture allowed to stand at 20° C. for one hour. The solution is neutralized with dilute hydrochloric acid and the acetone evaporated. The aqueous residue is made alkaline and extracted with ethyl acetate. The ethyl acetate extracts are washed with water, dried and the ethyl acetate distilled to obtain the desired (dl)-reg.-1-(3'-methyl-4'-nitrophenyl)-2-p-methylbenzamidopropane-1,3-diol of formula,

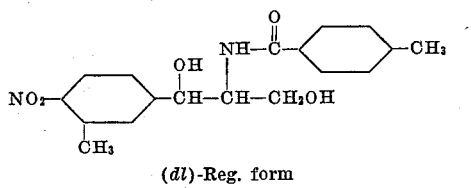

(dl)-Reg. form

The crude product thus obtained can be purified by recrystallization from ethanol.

*Example 9*

1.61 g. of lithium aluminum hydride dissolved in 100 cc. of anhydrous ether is added dropwise with stirring to 19.6 g. of methyl (dl)-ψ-N-phenylacetyl-2-nitro-4-chlorophenyl serinate in 6.5 liters of anhydrous ether over a period of six hours at 20° C. After the addition has been completed, the reaction mixture is stirred for an additional six hours and then 200 cc. of 2 N hydrochloric acid added slowly to decompose the insoluble metal complex. The ether phase is separated, washed with water, dried and the ether distilled. The aqueous phase is extracted with several portions of ethyl acetate, the ethyl acetate extracts combined, washed with water, dried and the ethyl acetate distilled. The residues from the ether phase and the ethyl acetate extracts are combined and dissolved in 300 cc. of acetone. 300 cc. of 0.1 N aqueous sodium hydroxide solution is added and the mixture allowed to stand at room temperature for one hour. The solution is neutralized with dilute hydrochloric acid and the acetone evaporated in vacuo. The aqueous residue is made alkaline with dilute sodium hydroxide solution and extracted with severeal portions of ethyl acetate. The combined ethyl acetate extracts are washed, dried and the ethyl acetate distilled to obtain the desired (dl)-ψ-1 - (2' - nitro - 4' - chlorophenyl) - 2 - phenylacetamidopropane-1,3-diol of formula,

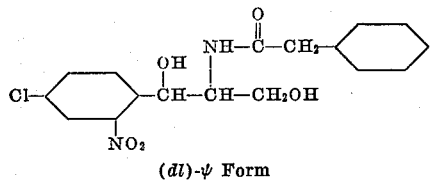

(dl)-ψ Form

The crude product thus obtained can be purified, if desired, by recrystallization from ethylene dichloride or from alcohol.

What I claim is:

1. Process for the production of a 1-nitrophenyl-2-aminopropane-1,3-diol derivative of formula,

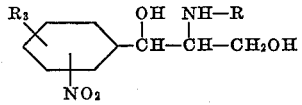

which comprises adding from about 10% less to 35% more than the theoretical quantity of lithium aluminum hydride necessary to react with the ester, carboxyl, amino and hydroxyl groups present in a nitrophenyl serine derivative of formula,

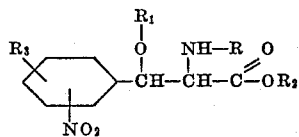

to a solution of said nitrophenyl serine derivative in an anhydrous non-hydroxylic organic solvent and decomposing the metal complex so formed with water; where R and $R_1$ are members of the class consisting of hydrogen and carboxylic acid acyl radicals, $R_2$ is a member of the class consisting of hydrogen, lower alkyl, phenyl and phenalkyl radicals and $R_3$ is a member of the class consisting of hydrogen, halogen, lower alkyl and lower alkoxy radicals.

2. Process for the production of a 1-nitrophenyl-2-dichloroacetamidopropane - 1,3 - diol which comprises adding from about 10% less to 35% more than the theoretical quantity of lithium aluminum hydride necessary to react with the ester and hydroxyl groups present in a lower alkyl N-dichloroacetyl p-nitrophenyl serinate in an anhydrous non-hydroxylic organic solvent and decomposing the metal complex so formed with water.

3. Process for the production of (l)-ψ-1-p-nitrophenyl-2-dichloroacetamidopropane-1,3-diol which comprises adding from about 10% less to 35% more than the theoretical quantity of lithium aluminum hydride necessary to react with the ester groups present in a nitrophenyl serine derivative of formula,

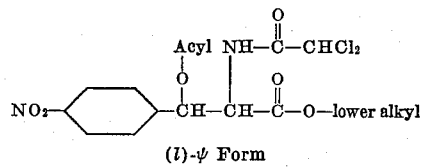

(l)-ψ Form to a solution of said nitrophenyl serine derivative in an anhydrous non-hydroxylic organic solvent and decomposing the metal complex so formed with water, acyl being a carboxylic acid acyl radical.

4. Process for the production of (l)-ψ-1-p-nitrophenyl - 2 - dichloroacetamidopropane - 1,3 - diol which comprises adding from about 10% less to 35% more than the theoretical quantity of lithium aluminum hydride necessary to react with the ester and hydroxyl groups present in a nitrophenyl serine derivative of formula,

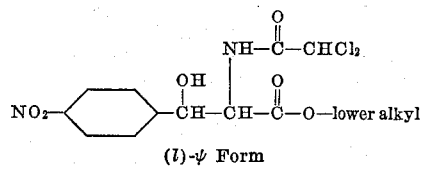

(l)-ψ Form to a solution of said nitrophenyl serine derivative in an anhydrous non-hydroxylic organic solvent and decomposing the metal complex so formed with water.

5. Process for the production of (dl)-ψ-1-p-nitrophenyl-2-dichloroacetamidopropane-1,3-diol which comprises adding from about 10% less to 35% more than the theoretical quantity of lithium aluminum hydride necessary to react with both of the ester groups present in a nitrophenyl serine derivative of formula,

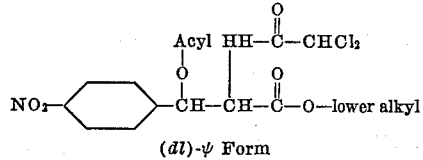

(dl)-ψ Form to a solution of said nitrophenyl serine derivative in an anhydrous non-hydroxylic organic solvent and decomposing the metal complex so formed with water, acyl being a carboxylic acid acyl radical.

6. Process for the production of (dl)-ψ-1-p-nitrophenyl-2-dichloroacetamidopropane-1,3-diol which comprises adding from about 10% less to 35% more than the theoretical quantity of lithium aluminum hydride necessary to react with the ester and hydroxyl groups present in a nitrophenyl serine derivative of formula,

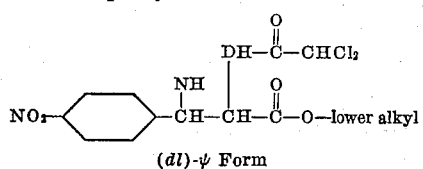

(dl)-ψ Form to a solution of said nitrophenyl serine derivative in an anhydrous non-hydroxylic organic solvent and decomposing the metal complex so formed with water.

7. Process for the production of (l)-ψ-1-p-nitrophenyl-2-aminopropane-1,3-diol which comprises adding from about 10% less to 35% more than the theoretical quantity of lithium aluminum hydride necessary to react with the hydroxyl, amino and ester groups present in a nitrophenyl serine derivative of formula,

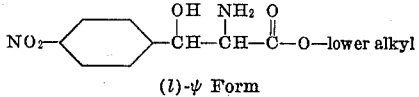

(l)-ψ Form to a solution of said nitrophenyl serine derivative in an anhydrous non-hydroxylic organic solvent and decomposing the metal complex so formed with water.

References Cited in the file of this patent

FOREIGN PATENTS

| | | |
|---|---|---|
| 827 | Costa Rica | May 2, 1951 |

OTHER REFERENCES

Carrara et al.: "Gazz. Chem. Ital.," vol. 79, November 1949, pp. 856–62.

Alberti et al.: "LaChimica e l'Industria," vol. 31 (1949), pp. 357–60.

Woolley: "J. Biol. Chem.," vol. 185, July 1950, pp. 293–305.

Dagleish: "J. Chem. Soc." London), January 1949, pp. 90–93.

Carrara et al.: "Gazz. Chim. Ital.," vol. 80, November 10, 1950, pp. 726 and 727.